US012789371B2

(12) United States Patent
Luo et al.

(10) Patent No.: US 12,789,371 B2
(45) Date of Patent: Nov. 10, 2026

(54) ROBOT FORCE CONTROL METHOD, AND COMPUTER-READABLE STORAGE MEDIUM AND ROBOT USING THE SAME

(71) Applicant: UBTECH ROBOTICS CORP LTD, Shenzhen (CN)

(72) Inventors: Xuan Luo, Shenzhen (CN); Chunyu Chen, Shenzhen (CN); Youjun Xiong, Shenzhen (CN)

(73) Assignee: UBTECH ROBOTICS CORP LTD, Shenzhen (CN)

( * ) Notice: Subject to any disclaimer, the term of this patent is extended or adjusted under 35 U.S.C. 154(b) by 159 days.

(21) Appl. No.: 19/010,237

(22) Filed: Jan. 6, 2025

(65) Prior Publication Data

US 2025/0289125 A1 Sep. 18, 2025

(30) Foreign Application Priority Data

Mar. 12, 2024 (CN) ......................... 202410278625.8

(51) Int. Cl.
*B25J 9/16* (2006.01)

(52) U.S. Cl.
CPC ........... *B25J 9/1633* (2013.01); *B25J 9/1664* (2013.01)

(58) Field of Classification Search
CPC ....... B25J 9/1633; B25J 9/1664; B25J 9/1605
See application file for complete search history.

(56) References Cited

U.S. PATENT DOCUMENTS 113,733 A * 4/1871 Britton ..................... A01B 3/18 172/361
11,602,644 B2 * 3/2023 Engwall ............... A61N 5/1077
11,602,844 B2 3/2023 Ren et al.
2021/0086364 A1 * 3/2021 Handa .................... G06V 20/56
2021/0122045 A1 * 4/2021 Handa .................... B25J 13/084
2022/0318459 A1 * 10/2022 Narang ................ G06N 3/0455
2022/0371184 A1 * 11/2022 Ratliff .................... B25J 9/1602
2023/0191596 A1 * 6/2023 Handa ...................... B25J 9/161 700/253

(Continued)

FOREIGN PATENT DOCUMENTS

CN 113733106 A 12/2021
CN 113954076 A 1/2022
CN 115972196 A 4/2023

*Primary Examiner* — Sihar A Karwan

(57) ABSTRACT

A robot force control method, and a computer-readable storage medium and a robot using the same are provided. The method includes: obtaining a joint acceleration control amount at a current control moment of the robot by performing a Riemannian Motion Policy (RMP)-based motion generation on an overall target task of the robot; determining, based on a preset control amount mapping relationship, a joint torque control amount at the current control moment according to the joint acceleration control amount at the current control moment, and executing the overall target task by performing a torque control on the robot according to the joint torque control amount at the current control moment. Through the above-mentioned method, the position control of robot is converted into the torque control of robot through a preset control amount mapping relationship, thereby realizing the torque control of robot under the algorithm framework of RMP.

20 Claims, 4 Drawing Sheets

(56) References Cited

U.S. PATENT DOCUMENTS

2023/0191605 A1* 6/2023 Handa ...................... B25J 9/161
700/257
2023/0241770 A1* 8/2023 Itou ........................ B25J 9/1666
700/246
2023/0294277 A1* 9/2023 Yang ...................... B25J 9/1612
700/217

* cited by examiner

ROBOT FORCE CONTROL METHOD, AND COMPUTER-READABLE STORAGE MEDIUM AND ROBOT USING THE SAME

CROSS REFERENCE TO RELATED APPLICATIONS

The present disclosure claims priority to Chinese Patent Application No. 202410278625.8, filed Mar. 12, 2024, which is hereby incorporated by reference herein as if set forth in its entirety.

TECHNICAL FIELD

The present disclosure relates to robot technology, and particularly to a robot force control method, and a computer-readable storage medium and a robot using the same.

BACKGROUND

In various robotic application fields including obstacle avoidance and autonomous obstacle avoidance, grasping operation, autonomous navigation, multi-robot system coordination, vision, and tactile servo, the Riemannian Motion Policy (RMP)-based motion generation methods have been applied in recent years because it can easily integrate multi-task spatial motion planning and motion control while maintaining the timeliness and stability of the algorithm. However, in the existing methods, the position control of robot is mostly realized under the algorithm framework of RMP while there is a difficulty to realize the torque control of robot.

BRIEF DESCRIPTION OF DRAWINGS

To describe the technical schemes in the embodiments of the present disclosure or in the prior art more clearly, the following briefly introduces the drawings required for describing the embodiments or the prior art. It should be understood that, the drawings in the following description merely show some embodiments. For those skilled in the art, other drawings can be obtained according to the drawings without creative efforts.

DETAILED DESCRIPTION

Figure 1:
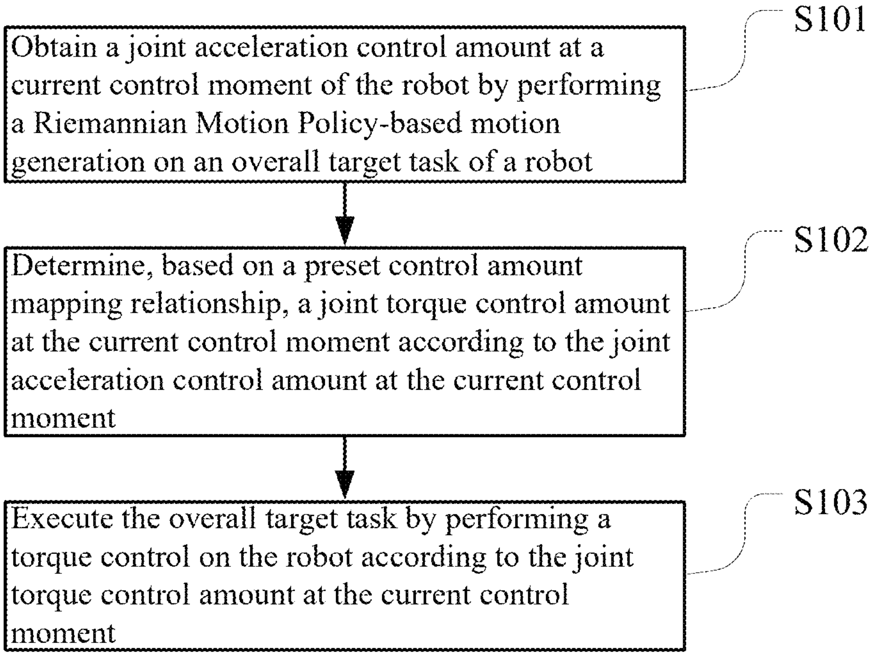
FIG. 1 is a flow chart of a robot force control method according to an embodiment of the present disclosure.

In order to make the objects, features and advantages of the present disclosure more obvious and easy to understand, the technical solutions in the embodiments of the present disclosure will be clearly and completely described below with reference to the drawings. Apparently, the described embodiments are part of the embodiments of the present disclosure, not all of the embodiments. All other embodiments obtained by those skilled in the art based on the embodiments of the present disclosure without creative efforts are within the scope of the present disclosure.

It is to be understood that, when used in the description and the appended claims of the present disclosure, the terms “including” and “comprising” indicate the presence of stated features, integers, steps, operations, elements and/or components, but do not preclude the presence or addition of one or a plurality of other features, integers, steps, operations, elements, components and/or combinations thereof.

It is also to be understood that, the terminology used in the description of the present disclosure is only for the purpose of describing particular embodiments and is not intended to limit the present disclosure. As used in the description and the appended claims of the present disclosure, the singular forms “a,” “an,” and “the” are intended to include the plural forms as well, unless the context clearly indicates otherwise.

It is also to be further understood that the term “and/or” used in the description and the appended claims of the present disclosure refers to any combination of one or more of the associated listed items and all possible combinations, and includes such combinations.

As used in the description and the appended claims, the term “if” may be interpreted as “when” or “once” or “in response to determining” or “in response to detecting” according to the context. Similarly, the phrase “if determined” or “if [the described condition or event] is detected” may be interpreted as “once determining” or “in response to determining” or “on detection of [the described condition or event]” or “in response to detecting [the described condition or event]”.

In addition, in the present disclosure, the terms “first”, “second”, “third”, and the like in the descriptions are only used for distinguishing, and cannot be understood as indicating or implying relative importance.

In various robotic application fields including obstacle avoidance and autonomous obstacle avoidance, grasping operation, autonomous navigation, multi-robot system coordination, vision, and tactile servo, the RMP-based motion generation methods have been applied in recent years because it can easily integrate multi-task spatial motion planning and motion control while maintaining the timeliness and stability of the algorithm. However, in the existing methods, the position control of robot is mostly realized under the algorithm framework of RMP while there is a difficulty to realize the torque control of robot. Accordingly, in the embodiments of the present disclosure, the position control of robot is converted into the torque control of robot through a preset control amount mapping relationship, thereby realizing the torque control of robot under the algorithm framework of RMP.

In the embodiments of the present disclosure, the main body of execution may be a robot including link(s) and joint(s) connected to the link(s), which may be, for example, a redundant robot with seven axes (i.e., with seven degrees of freedom).

Figure 4:
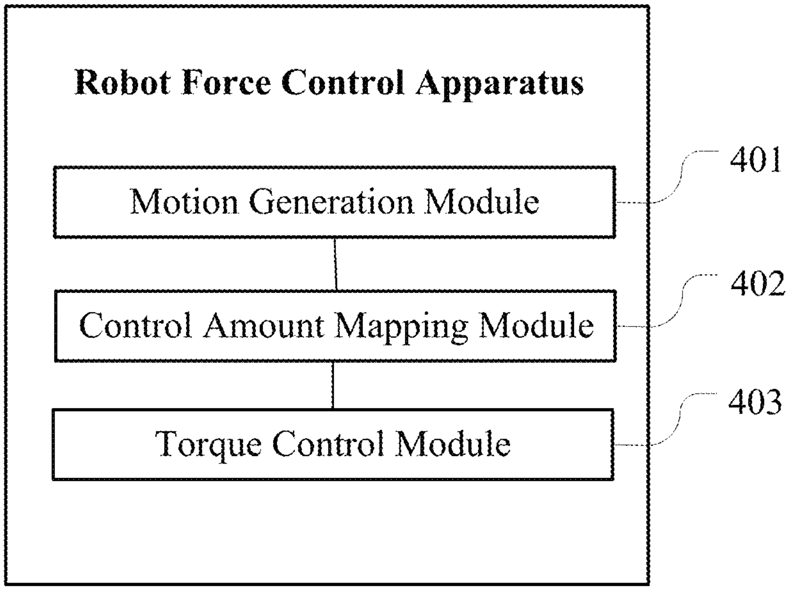
FIG. 4 is a schematic diagram of the structure of a robot force control apparatus according to an embodiment of the present disclosure.
Figure 5:
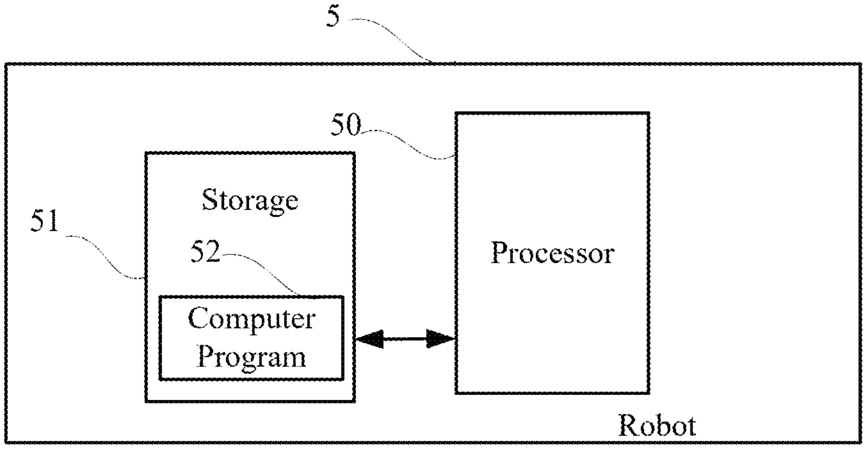
FIG. 5 is a schematic diagram of a robot according to an embodiment of the present disclosure.

FIG. 1 is a flow chart of a robot force control method according to an embodiment of the present disclosure. In this embodiment, a force control method for robot may be applied on (a processor of) the above-mentioned robot. In other embodiments, the method may be implemented through a robot force control apparatus as shown in FIG. 4, or a robot as shown in FIG. 5. As shown in FIG. 1, in this embodiment, the robot force control method may include the following steps.

S101: obtaining a joint acceleration control amount at a current control moment of the robot by performing a Riemannian Motion Policy (RMP)-based motion generation on an overall target task of the robot.

In this embodiment, the overall target task may be decomposed into at least one subtask, and each subtask may be further decomposed into at least one local subtask. Taking the overall target task of object grasping as an example, it may be decomposed into a reaching subtask, an obstacle avoidance subtask, a joint limit avoidance subtask, and other subtasks, where the reaching subtask may be further decomposed into local subtask 1, local subtask 2, local subtask 3, and so on. A control moment refers to a specific moment in the control system of the robot, which may be a time point at which control calculations and control signals are output. The current control moment refers to the control moment at the current timing cycle of the robot, the previous control moment refers to the control moment at the previous timing cycle of the robot, and the next control moment refers to the control moment at the next timing cycle of the robot.

In this embodiment, a corresponding priority may be set for each subtask in advance, for example, when transporting an object liable to capsize, the posture of the object rather than its arrival position must be strictly guaranteed first. Each hierarchical task may be obtained by clustering subtasks according to their priorities. In which, each hierarchical task is composed of the subtasks with the same priority. As an example, the overall goal task is decomposed into six subtasks namely subtask 1, subtask 2, subtask 3, subtask 4, subtask 5 and subtask 6, and subtask 1 and subtask 3 are set as the lowest priority, subtask 6 is set as the second lowest priority, and subtask 2, subtask 4 and subtask 5 are set as the highest priority. In this case, if the subtasks are clustered according to their priorities, three hierarchical tasks can be obtained as, in priority order from low to high, 1st level task (consisting of subtask 1 and subtask 3), 2nd level task (consisting of subtask 6), and 3rd level task (consisting of subtask 2, subtask 4, and subtask 5). Then, the overall goal task may include hierarchical tasks of different priorities, each hierarchical task may include at least one subtask, and each subtask may include at least one local subtask.

The RMP refers to a type of motion policy with geometric information described by second-order differential equations in a Riemannian manifold space, which has a mathematical canonical form of $(a,M)^{\Theta}$. In which, $\Theta$ represents a m-dimensional Riemannian manifold that has the spatial coordinates belonging to $P^{m\mu}$, $a:P^m\times P^m\rightarrow P^m$ represents a second-order continuous motion policy, and $M:P^m\times P^m\rightarrow P^{m\times m}$ represents a differential mapping. According to the naming rules of robot kinematics, a may be regarded as an expected acceleration, and M may be regarded as an inertia matrix.

In addition to the canonical form, the RMP also has a mathematical natural form of $(M,f)^{\Theta}$, where f=Ma represents an expected force. This mathematical expression form is more convenient for performing RMP-related algebraic operations (RMP-algebra).

RMPflow is a graph computing process for manifold space, which is for quickly integrating local RMPs designed for specific tasks under different dimensional manifolds into a global RMPs under a target space to achieve the purpose of outputting the motion policy that can achieve all specific tasks. The process of RMPflow is mainly implemented by cyclic iterating three information flow processing operations of pushforward, pullback, and resolve. In which, pushforward refers to the forward transfer operation of state information flow, pullback refers to the reverse transfer operation of RMP information flow, and resolve refers to the solving operation of RMP information flow returning from the natural form to the canonical form.

In this embodiment, on the basis of the existing RMP algorithm framework, a Dynamically-consistent Hierarchical RMP (Dyn-Hier-RMP) is provided. For the data storage requirements of task stratification and force control, Dyn-Hier-RMP is improved by optimization based on the tree data structure in the existing RMP algorithm framework (RMP-tree): first, a stem node is inserted between the conventional root node and leaf node to separate the task and the body of the robot; second, a branch node is inserted between the stem node and the leaf node to reflect task stratification and collect hierarchical task information; third, in addition to the original root node, a dual root node of joint torque associated with it is designed to introduce a binary relationship between force and position control amounts.

Figure 2:
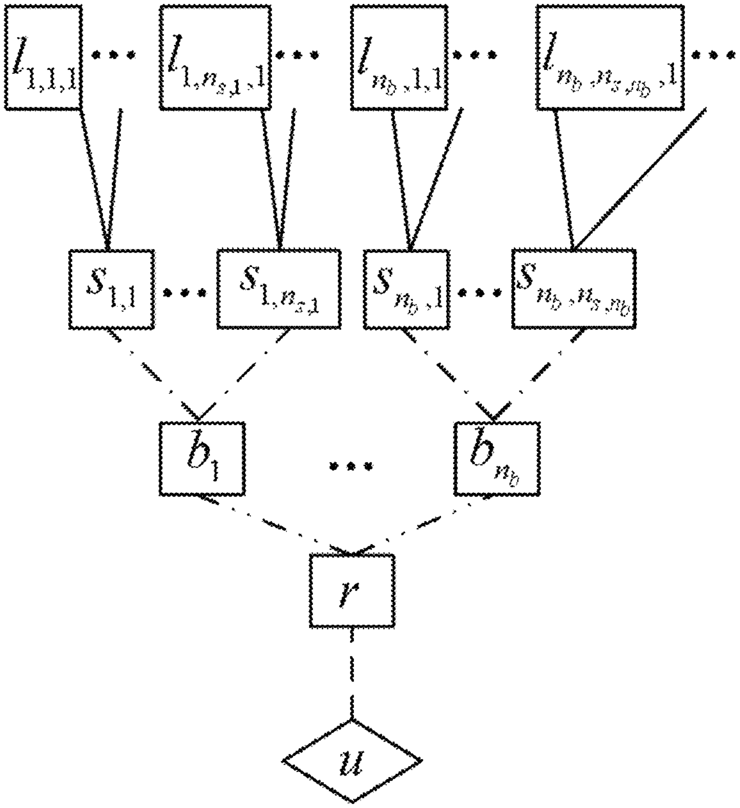
FIG. 2 is a schematic diagram of an improved RMP tree data structure according to an embodiment of the present disclosure.

FIG. 2 is a schematic diagram of an improved RMP tree data structure according to an embodiment of the present disclosure. In which, r indicates the root node representing the overall target task mapped on the configuration space $\Theta$ of the robot that corresponds to the state quantity of $(q,\dot{q})$ and the motion policy of $(M,f)^{\Theta}$; u indicates the dual root node representing the overall target task mapped on the joint torque space Y, where Y is the axial scaling space of $\Theta$ that corresponds to the state quantity of $$\tau;\ b_j|_{i=1}^{n_b}$$

indicates the branch node, as the incarnation of r, which represents the component corresponding to the i-th level task in r that corresponds to the state quantity of $(q_i,\dot{q}_i)$ and the motion policy of $$(M_i,\ f_i)^{\Theta};\ s_{i,j}|_{j=1}^{n_{s,i}}$$

indicates the stem node representing the subtask positioned on the operation space $\Xi_{i,j}$ of the robot that corresponds to the state quantity of $(x_{i,j},\dot{x}_{i,j})$ and the motion policy of $(M_{i,j},f_{i,j})^{\Xi_{i,j}}$; and $$l_{i,j,k}|_{k=1}^{n_{l,i,j}}$$

indicates the leaf node representing the local subtask positioned on the local task space $\Delta_{i,j,k}$ that corresponds to the state quantity of $(d_{i,j,k},\dot{d}_{i,j,k})$ and the motion policy of $(M_{i,j,k},f_{i,j,k})^{\Delta_{i,j,k}}$.

In this embodiment, for the control calculation requirements of task stratification and force control, improvements is realized by optimizing based on the RMPflow calculation process in the existing RMP algorithm framework: first, in the reverse operation from the stem node to the branch node, robot kinematics parameters are introduced to achieve the optimization of the joint torque level; second, in the solving operation from the branch node to the root node, the Dynamically-consistent Null Space Projection (Dyn-NSP) and its recursive algorithm are introduced to achieve the hierarchical control of tasks; third, in the solving operation from the root node to the dual root node, a joint torque calculation method which performs Proportional-Derivative (PD) control based on the state quantity of the ideal configuration space is introduced to improve the execution accuracy of tasks.

As shown in FIG. 2, in this embodiment, the nodes are connected by edges, and each edge represents the data conversion relationship between the two connected spaces that corresponds to the operations included in the improved RMPflow calculation process. In which, $$l_{i,j,k}|_{k=1}^{n_{l,i,j}} \text{ and } s_{i,j}|_{j=1}^{n_{s,j}}$$

are connected through an edge indicated by a solid line, which represents that the two adopt the conventional pull-back operation in the reverse data propagation;

$$s_{i,j}|_{j=1}^{n_{s,j}} \text{ and } b_i|_{i=1}^{n_b}$$

are connected through an edge indicated by a dash-dot line, which represents that the two adopt the operation space dynamics-based pullback operation (dyn-pullback) in the reverse data propagation;

$$b_i|_{i=1}^{n_b}$$

and r are connected through an edge indicated by a double dash-dot line, which represents that the two adopt the Dyn-NSP-based recursive resolve operation (rec-resolve) in the reverse data propagation; and r and u are connected through an edge indicated by a dotted line, which represents that the spatial data conversion between the two adopt the spatial data conversion between the two adopts the resolve operation (pd-resolve) that is based on the robot kinematics and the PD control of ideal configuration space state quantity.

The general expression of robot kinematics and dynamics equations are as equations of:

$$J(q)\ddot{q} + \dot{J}(q)\dot{q} = \ddot{x};$$

and $$A(q)\ddot{q} + b(q, \dot{q}) + g(q) = \tau = J^T(q)F;$$

where, $$J = \frac{\partial x}{\partial q}$$

represents the Jacobian matrix of the robot; A represents the inertia matrix of the robot, b represents the Coriolis force item, and g represents the gravity item; and F represents the generalized action force in the operating space of the robot.

Therefore, through the above-mentioned equations, the relationship between the joint acceleration of the robot and the generalized action force, as well as the general expression of the dynamics equations of the operating space may be obtained as equations of:

$$\bar{J}^T A\ddot{q} + \bar{J}^T(b + g) = F;$$

and $$\Lambda(q)\ddot{x} + \mu(q, \dot{q}) + p(q) = F;$$

where, $\Lambda=(JA^{-1}J^T)^{-1}$ represents the kinetic energy matrix of the operating space; $\bar{J}=A^{-1}J^T\Lambda$ represents the dynamic consistency pseudo-inverse of J; and $\mu=\bar{J}^Tb-\Lambda\dot{J}\dot{q}$, and $p=\bar{J}^Tg$.

According to the above-mentioned force-position binary relationship of the robot, the conversion method of the motion policy between different spaces can be obtained.

Specifically, for the conversion from $$(M_{i,j,k}, f_{i,j,k})^{\Delta_{i,j,k}}|_{k=1}^{n_{l,i,j}}$$

to $(M_{i,j},f_{i,j})^{\Xi_{i,j}}$, since the local task space is independent of the kinetics of the body of the robot, the corresponding pullback operation may be equivalent to the following weighted least squares problem as an equation of:

$$\min_{\ddot{x}_{i,j}} \sum_{k=1}^{n_{l,i,j}} \left\| J_{i,j,k}\ddot{x}_{i,j} + \dot{J}_{i,j,k}\dot{x}_{i,j} - \ddot{d}_{i,j,k} \right\|_{M_{i,j,k}}^2;$$

where, $$J_{i,j,k} = \frac{\partial d_{i,j,k}}{\partial x_{i,j}}.$$

By calculating the derivative of the forgoing equation and let it equal to zero, the analytical equations may be obtained as equations of:

$$M_{i,j}\ddot{x}_{i,j}=f_{i,j};$$

$$M_{i,j} = \sum_{k=1}^{n_{l,i,j}} J_{i,j,k}^T M_{i,j,k} J_{i,j,k};$$

and $$f_{i,j} = \sum_{k=1}^{n_{l,i,j}} J_{i,j,k}^T \left(f_{i,j,k} - M_{i,j,k}\dot{J}_{i,j,k}\dot{x}_{i,j}\right);$$

where, $f_{i,j,k}=M_{i,j,k}\ddot{d}_{i,j,k}$.

Since $M_{i,j}$ is not full rank, let $$M_{i,j}^{\#} = pinv(M_{i,j})$$

represents the Moore-Penrose pseudo-inverse of $M_{i,j}$, then $$\ddot{x}_{i,j} = M_{i,j}^{\#} f_{i,j}.$$

Specifically, for the conversion from $$(M_{i,j}, f_{i,l})^{\Xi_{i,j}}|_{j=1}^{n_{s,i}}$$

to $(M_i,f_i)^{\Theta}$, according to the association between the operation space of the robot and the kinetics of the body of the robot, the corresponding dyn-pullback operation may be equivalent to the following weighted least squares problem as an equation of:

$$\min_{\ddot{q}_i} \sum_{j=1}^{n_{s,i}} \| J_{i,j}\ddot{q}_i + \dot{J}_{i,j}\dot{q}_i - \ddot{x}_{i,j} \|^2_{\Lambda_{i,j}};$$

where, $$J_{i,j} = \frac{\partial x_{i,j}}{\partial q_i},$$

By calculating the derivative of the forgoing equation and let it equal to zero, the analytical equations may be obtained as equations of:

$$M_i\ddot{q}_i = f_i;$$

$$M_i = \sum_{j=1}^{n_{s,i}} J_{i,j}^T \Lambda_{i,j} J_{i,j};$$

and $$f_i = \sum_{j=1} J_{i,j}^T \Lambda_{i,j}(M_{i,j}^{\#} f_{i,j} - \dot{J}_{i,j}\dot{q}_i).$$

It can be seen that $M_i$ is also not full rank and has a null space.

The hierarchical control of tasks is realized by the rec-resolve operation in the reverse data propagation from $$b_i|_{i=1}^{n_b}$$

to r. It is known that the optimal joint acceleration control amount $$\ddot{q}_1^{cmd}$$

of the first level task satisfies the motion policy represented by $(M_1,f_1)^{\Theta}$. Since $M_1$ is a symmetric semi-positive definite matrix, it is impossible to perform a dynamic consistency pseudo-inverse operation on it directly. Therefore, a Cholesky-like decomposition for covariance matrix may be performed on it first as an equation of:

$$M_1 = J_1^T J_1;$$

where, $J_1$=cholcov($M_1$) is a $m_1 \times n$ dimensional row-full rank matrix, m, represents the ranks of $M_1$, and n represents the dimensions of the drive joint of the robot.

Therefore, the equivalent relationship between the joint acceleration control amount of the corresponding task level and the generalized action force is as equations of:

$$J_1\ddot{q}_1^{cmd} = F_1. \text{ and } F_1 = \bar{J}_1^T f_1.$$

Therefore, the task control amount $$\ddot{q}_1^{cmd}$$

of the first level is as an equation of:

$$\ddot{q}_1^{cmd} = \bar{J}_1 F_1.$$

After the task control amount $$\ddot{q}_{i-1}^{cmd}$$

of the i−1-th level is obtained, considering that the execution of the i-th level task should not interfere with the previous i−1 level tasks, according to the equivalent relationship between the joint acceleration control amount corresponding to the parameter $(J_i,F_i)$ and the generalized action force, the solving of $$\ddot{q}_i^{cmd}$$

may be expressed as the constrained least squares problem as equations of:

$$\begin{aligned} &\min_{\ddot{q}_i^{cmd}} \| J_i\ddot{q}_i^{cmd} - F_i \|^2 \\ &\text{s.t.} \quad J_1\ddot{q}_i^{cmd} - F_2 = 0 \\ &\qquad \vdots \qquad\quad \vdots \\ &\qquad J_{i-1}\ddot{q}_i^{cmd} - F_{i-1} = 0 \end{aligned}.$$

The Dyn-NSP technology is introduced here, then the constraint part of the forgoing equations may be converted as an equation of:

$$\ddot{q}_i^{cmd} = \ddot{q}_{i-1}^{cmd} + N_i^{pre} a_i;$$

where, $$N_i^{pre}$$

represents the Dyn-NSP matrix for all the tasks before the i-th level.

By substituting into the objective function, it may be simplified as an equation of:

$$\min_{a_i} \| J_i^{pre} a_i - F_i^{pre} \|^2;$$

where, $$F_i^{pre} = F_i - J_i\ddot{q}_{i-1}^{cmd}.$$

Therefore, it may obtain the analytical solution of $$\ddot{q}_i^{cmd}$$

as an equation of:

$$\ddot{\boldsymbol{q}}_i^{cmd} = \ddot{\boldsymbol{q}}_{i-1}^{cmd} + \boldsymbol{N}_i^{pre}\overline{\boldsymbol{J}_i\boldsymbol{N}_i^{pre}}\boldsymbol{F}_i^{pre} = \ddot{\boldsymbol{q}}_{i-1}^{cmd} + \overline{\boldsymbol{J}_i^{pre}}\boldsymbol{F}_i^{pre};$$

where, it may obtain $$N_i^{pre}$$

by recursive method as an equation of:

$$\boldsymbol{N}_i^{pre} = \boldsymbol{N}_{i-1}^{pre}\left\lfloor \boldsymbol{I} - \overline{\boldsymbol{J}_{i-1}\boldsymbol{N}_{i-1}^{pre}}\left(\boldsymbol{J}_{i-1}\boldsymbol{N}_{i-1}^{pre}\right)\right\rfloor = \boldsymbol{N}_{i-1}^{pre}\left(\boldsymbol{I} - \overline{\boldsymbol{J}_{i-1}^{pre}}\boldsymbol{J}_{i-1}^{pre}\right);$$

where, I represents the unit matrix with the same dimension as the driving joint of the robot.

Figure 3:
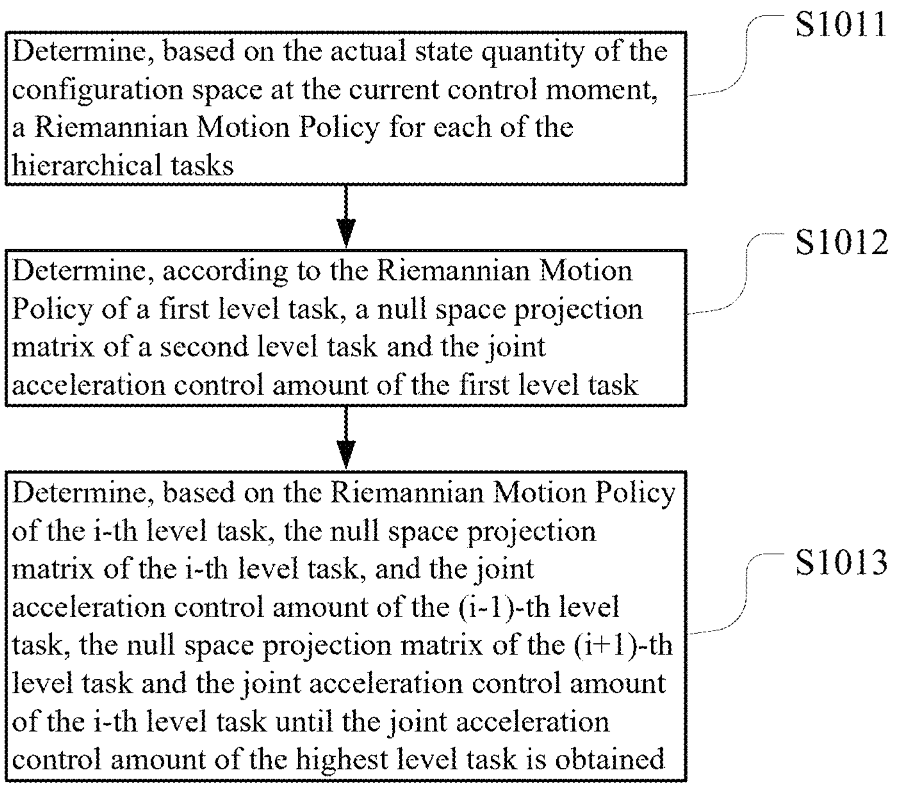
FIG. 3 is a flow chart of solving a joint acceleration control amount of each hierarchical task in priority order from low to high according to an embodiment of the present disclosure.

FIG. 3 is a flow chart of solving a joint acceleration control amount of each hierarchical task in priority order from low to high according to an embodiment of the present disclosure. According to the forgoing analysis and derivation, during the process of the RMP-based motion generation, the joint acceleration control amount of the next level task may be projected into the null space of the previous-level task, so as to solve the joint acceleration control amount of each of the hierarchical tasks in priority order from low to high. As shown in FIG. 3, the solving process may include the following steps.

S1011: determining, based on the actual state quantity of the configuration space at the current control moment, a Riemannian Motion Policy for each of the hierarchical tasks.

Specifically, the actual state quantity of the configuration space of r at the current control moment t may be read first, and then the forward transfer operation (pushforward) may be performed to determine, based on the actual state quantity of the configuration space at the current control moment and a kinematic model of the robot, a state quantity of each of the hierarchical tasks, a state quantity of each subtask, and a state quantity of each local subtask, as equations of:

$(q_i,\dot{q}_i)=(q,\dot{q})$;

$(x_{i,j},\dot{x}_{i,j})=(\psi_{i,j}(q_i),J_{i,j}(q_i)\dot{q}_i$; and $(d_{i,j,k},\dot{d}_{i,j,k})=(\psi_{i,j}(x_{i,j}),J_{i,j}(x_{i,j})\dot{x}_{i,j})$;

where, $\psi_{i,j}$ represents the kinematics positive solution of the robot, $\psi_{i,j,k}$ represents the positive solution of the local task space.

Then, by giving a tracking trajectory or a preset geometric dynamical system (GDS), it may determine, based on the state quantity of each local subtask, the Riemannian Motion Policy $(M_{i,j,k},f_{i,j,k})^{\Lambda_{i,j,k}}$ of the local subtask. Then, the reverse propagation operation (pullback) may be performed to determine, based on the state quantity and Riemannian Motion Policy of each local subtask, the Riemannian Motion Policy $(M_{i,j},f_{i,j})^{\Xi_{i,j}}$ of each subtask, as equations of:

$$\boldsymbol{M}_{i,j} = \sum_{k=1}^{n_{l,i,j}} \boldsymbol{J}_{i,j,k}^T \boldsymbol{M}_{i,j,k} \boldsymbol{J}_{i,j,k};$$

and $$\boldsymbol{f}_{i,j} = \sum_{k=1}^{n_{l,i,j}} \boldsymbol{J}_{i,j,k}^T\left(\boldsymbol{f}_{i,j,k} - \boldsymbol{M}_{i,j,k}\dot{\boldsymbol{J}}_{i,j,k}\dot{\boldsymbol{x}}_{i,j}\right).$$

Based on the dynamics equation of the operation space of the robot, the operation space kinetic energy matrix $\Lambda_{i,j}$ that corresponds to $s_{i,j}$ may be calculated as an equation of:

$$\Lambda_{i,j} = \left(\boldsymbol{J}_{i,j}\boldsymbol{A}^1\boldsymbol{J}_{i,j}^T\right)^{-1}.$$

Finally, the operation space kinetics-based pullback operation (dyn-pullback) may be performed to determine, based on kinetics parameters of the robot and the state quantity and Riemannian Motion Policy of each subtask, the Riemannian Motion Policy of each of the hierarchical tasks, as equations of:

$$\boldsymbol{M}_i = \sum_{j=1}^{n_{s,i}} \boldsymbol{J}_{i,j}^T \Lambda_{i,j} \boldsymbol{J}_{i,j};$$

and $$\boldsymbol{f}_i = \sum_{j=1}^{n_{s,i}} \boldsymbol{J}_{i,j}^T \Lambda_{i,j}\left(pinv\,(\boldsymbol{M}_{i,j})\boldsymbol{f}_{i,j} - \dot{\boldsymbol{J}}_{i,j}\dot{\boldsymbol{q}}_i\right).$$

Furthermore, using the Cholesky-like decomposition for covariance matrix, the equivalent relationship parameter $(J_i,F_i)$ between the joint acceleration control amount corresponding to $b_i$ and the generalized action force may also be obtained as equations of:

$J_i$=cholcov($M_i$); and $$F_i = \mathcal{J}_i^T f_i.$$

S1012: determining, according to the Riemannian Motion Policy of a first level task among the hierarchical tasks, a null space projection matrix of a second level task among the hierarchical tasks and the joint acceleration control amount of the first level task.

Specifically, for the first level task, the intermediate variables $$N_1^{pre},\ J_i^{pre},\ \overline{J_i^{pre}},\ \text{and}\ N_2^{pre}$$

may be calculated in sequence using equations of:

$$\overline{\boldsymbol{J}_1^{pre}} = \bar{\boldsymbol{J}}_1 = \boldsymbol{A}^{-1}\boldsymbol{J}_1^T\left(\boldsymbol{J}_1\boldsymbol{A}^1\boldsymbol{J}_1^T\right)^1;$$

and $$\boldsymbol{N}_2^{pre} = \boldsymbol{N}_1^{pre}\left(\boldsymbol{I} - \overline{\boldsymbol{J}_1^{pre}}\boldsymbol{J}_1^{pre}\right) = \boldsymbol{I} - \bar{\boldsymbol{J}}_1\boldsymbol{J}_1 = \boldsymbol{N}_1.$$

Then, the joint acceleration control amount $$\ddot{q}_1^{cmd}$$

of the first level task may be calculated using an equation of:

$$\ddot{q}_1^{cmd} = \overline{J}_1 F_1.$$

S1013: determining, based on the Riemannian Motion Policy of the i-th level task among the hierarchical tasks, the null space projection matrix of the i-th level task, and the joint acceleration control amount of the (i−1)-th level task, the null space projection matrix of the (i+1)-th level task and the joint acceleration control amount of the i-th level task until the joint acceleration control amount of the highest level task among the hierarchical tasks is obtained.

Specifically, when i is larger than 1, the intermediate variables $$F_i^{pre}, J_i^{pre}, \overline{J_i^{pre}}, \text{ and } N_{i+1}^{pre}$$

may be calculated in sequence using equations of:

$$\boldsymbol{F}_1^{pre} = \boldsymbol{F}_1 - \boldsymbol{J}_i \ddot{\boldsymbol{q}}_{i-1}^{cmd};$$

$$J_i^{pre} = J_i N_i^{pre};$$

$$\overline{\boldsymbol{J}_i^{pre}} = \boldsymbol{A}^{-1} \boldsymbol{J}_i^{preT} \left( \boldsymbol{J}_1^{pre} \boldsymbol{A}^{-1} \boldsymbol{J}_i^{preT} \right)^{-1};$$

and $$\boldsymbol{N}_{i+1}^{pre} = \boldsymbol{N}_i^{pre} \left( \boldsymbol{I} - \overline{\boldsymbol{J}_i^{pre}} \boldsymbol{J}_i^{pre} \right).$$

Then, the joint acceleration control amount $$\ddot{q}_i^{cmd}$$

of the i-th level task may be calculated using an equation of:

$$\ddot{\boldsymbol{q}}_i^{cmd} = \ddot{\boldsymbol{q}}_{i-1}^{cmd} + \boldsymbol{J}_i^{pre} \boldsymbol{F}_i^{pre}.$$

It should be noted that step S1013 is a recursive process. First, let i be 2, and a round of calculation is performed to solve the joint acceleration control amount $$\ddot{q}_2^{cmd}$$

of the second level task; then, let i=i+1, at this time, a round of calculation is performed with i of 3 to solve the joint acceleration control amount $$\ddot{q}_3^{cmd}$$

of the third level task, and so on, until the joint acceleration control amount $$\ddot{q}_H^{cmd}$$

of the H-th level task is obtained, where H is the total number of the levels of tasks, and the H-th level is the highest level. In this recursive process, by reusing some intermediate parameters in the process of calculating the lower level tasks, the calculation efficiency is improved, and the real-time generation of the overall motion policy can also be guaranteed.

S102: determining, based on a preset control amount mapping relationship, a joint torque control amount at the current control moment according to the joint acceleration control amount at the current control moment.

In which, the control amount mapping relationship is a mapping relationship between the joint acceleration control amount and the joint torque control amount. Specifically, the joint torque mapping control amount $$\tau_H^{des}$$

corresponding to the joint acceleration control amount at the current control moment may be determined based on the control amount mapping relationship as an equation of:

$$\boldsymbol{\tau}_H^{des} = \boldsymbol{A} \ddot{\boldsymbol{q}}_H^{cmd} + \boldsymbol{v};$$

where, v represents the sum of the Coriolis force item and the gravity item.

In one embodiment, the joint torque mapping control amount $$\tau_H^{des}$$

may be directly used as the joint torque control amount $$\tau_H^{cmd}$$

at the current control moment.

In another embodiment, in order to improve the accuracy of task execution, after obtaining the joint torque control amount $$\tau_H^{cmd},$$

the expected state quantity $$\left(q_H^{des}, \dot{q}_H^{des}\right)$$

of the configuration space at the current control moment may be first determined based on the actual state quantity $(q_{last}, \dot{q}_{last})$ of the configuration space and the joint torque control amount $$\ddot{q}_{last}^{cmd}$$

at the previous control moment, as equations of:

$$\dot{\boldsymbol{q}}_H^{des} = \dot{\boldsymbol{q}}_{last} + \ddot{\boldsymbol{q}}_{last}^{cmd}\Delta t;$$

and $$\boldsymbol{q}_H^{des} = \boldsymbol{q}_{last} + \dot{\boldsymbol{q}}_{hst} + \frac{1}{2}\ddot{\boldsymbol{q}}_{last}^{cmd}\Delta t^2;$$

where, $\Delta t$ represents the time step, that is, the interval between two adjacent control moments.

Then, the joint torque control amount $$\tau_H^{cmd}$$

at the current control moment may be determined based on the joint torque mapping control amount $$\tau_H^{des}$$

and the expected state quantity $$\left(q_H^{des}, \dot{q}_H^{des}\right)$$

of the configuration space at the current control moment. Specifically, the state quantity difference between the expected state quantity $$\left(q_H^{des}, \dot{q}_H^{des}\right)$$

of the configuration space and the actual state quantity $(q, \dot{q})$ of the configuration space at the current control moment may be calculated, and the PD control may be performed on the joint torque mapping control amount $$\tau_H^{des}$$

based on the state quantity difference to obtain the joint torque control amount $$\tau_H^{cmd}$$

at the current control moment as an equation of:

$$\boldsymbol{\tau}_H^{cmd} = \left(\boldsymbol{A}\ddot{\boldsymbol{q}}_H^{cmd} + v\right) + k_p\left(\boldsymbol{q}_H^{des} - \boldsymbol{q}\right) + k_d\left(\dot{\boldsymbol{q}}_H^{des} - \dot{\boldsymbol{q}}\right);$$

where, $k_p$ and $k_d$ represent the proportional control coefficient and the differential control coefficient, respectively.

S103: executing the overall target task by performing a torque control on the robot according to the joint torque control amount at the current control moment.

It should be noted that the process of the torque control of the robot that is shown in FIG. 1 is a recursive process. First, let the time step parameter t be 1, and a round of the torque control is performed; then, let t=t+1, at this time, a round of the torque control is performed with t of 2, and so on to continue the torque control on the robot at each subsequent control moment until t>T, that is, a preset total number T of time steps is reached.

It should be noted that after the robot torque control is performed at each control moment, the parameters need to be updated according to equations of: $(q_{last}, \dot{q}_{last}) = (q, \dot{q})$ and $$\ddot{q}_{last}^{cmd} = \ddot{q}_H^{cmd},$$

so as to use at the next control moment. In particular, at the first control moment, that is, when t is 1, the default values of $(q_{last}, \dot{q}_{last})$ and $$\ddot{q}_{last}^{cmd}$$

are the initial configuration space state quantity $(q_0, \dot{q}_0)$ of the robot and 0, respectively.

In summary, in this embodiment, it obtains a joint acceleration control amount at a current control moment of the robot by performing an RMP-based motion generation on an overall target task of the robot; determine, based on a preset control amount mapping relationship, a joint torque control amount at the current control moment according to the joint acceleration control amount at the current control moment, where the control amount mapping relationship is a mapping relationship between the joint acceleration control amount and the joint torque control amount; and execute the overall target task by performing a torque control on the robot according to the joint torque control amount at the current control moment. In this manner, the position control of robot is converted into the torque control of robot through a preset control amount mapping relationship, thereby realizing the torque control of robot under the algorithm framework of RMP.

FIG. 4 is a schematic diagram of the structure of a robot force control apparatus according to an embodiment of the present disclosure. In this embodiment, an apparatus for controlling the above-mentioned robot may be implemented as a controller which may be used in the above-mentioned robot. As shown in FIG. 4, the robot force control apparatus corresponding to the robot force control method in the forgoing embodiment is provided.

In this embodiment, the robot force control apparatus may include:

a motion generation module 401 configured to obtain a joint acceleration control amount at a current control moment of the robot by performing a Riemannian Motion Policy-based motion generation on an overall target task of the robot;

a control amount mapping module 402 configured to determine, based on a preset control amount mapping relationship, a joint torque control amount at the current control moment according to the joint acceleration control amount at the current control moment, where the control amount mapping relationship is a mapping relationship between the joint acceleration control amount and the joint torque control amount; and a torque control module 403 configured to execute the overall target task by performing a torque control on the robot according to the joint torque control amount at the current control moment.

In one embodiment, the control amount mapping module 402 may include:

a control amount mapping unit configured to determine, based on the control amount mapping relationship, a joint torque mapping control amount corresponding to the joint acceleration control amount at the current control moment;

a configuration space expected state quantity determining unit configured to determine, based on an actual state quantity of a configuration space and the joint torque control amount at a previous control moment of the robot, an expected state quantity of the configuration space at the current control moment; and a joint torque control amount determining unit configured to determine, based on the joint torque mapping control amount and the expected state quantity of the configuration space at the current control moment, the joint torque control amount at the current control moment.

In one embodiment, the joint torque control amount determining unit may be specifically configured to: calculate a state quantity difference between the expected state quantity and the actual state quantity of the configuration space at the current control moment; and obtain the joint torque control amount at the current control moment by performing a proportional differential control on the joint torque mapping control amount according to the state quantity difference.

In one embodiment, the overall target task includes hierarchical tasks of different priorities; and the motion generation module 401 may be specifically configured to solve the joint acceleration control amount of each of the hierarchical tasks in an order of the priorities from low to high by projecting the joint acceleration control amount of a next level task among the hierarchical tasks into the null space of a previous level task among the hierarchical tasks in the Riemannian Motion Policy-based motion.

In one embodiment, the motion generation module 401 may include:

a Riemannian Motion Policy determining unit configured to determine, based on the actual state quantity of the configuration space at the current control moment, a Riemannian Motion Policy for each of the hierarchical tasks; and a joint acceleration control amount determining unit configured to determine, according to the Riemannian Motion Policy of a first level task among the hierarchical tasks, a null space projection matrix of a second level task among the hierarchical tasks and the joint acceleration control amount of the first level task; and determining, based on the Riemannian Motion Policy of the i-th level task among the hierarchical tasks, the null space projection matrix of the i-th level task, and the joint acceleration control amount of the (i−1)-th level task, the null space projection matrix of the (i+1)-th level task and the joint acceleration control amount of the i-th level task until the joint acceleration control amount of the highest level task among the hierarchical tasks is obtained.

In one embodiment, each hierarchical task may include at least one subtask, and each subtask may include at least one local subtask. The Riemannian Motion Policy determining unit may be specifically configured to:

determine, based on the actual state quantity of the configuration space at the current control moment and a kinematic model of the robot, a state quantity of each of the hierarchical tasks, a state quantity of each subtask, and a state quantity of each local subtask;

determine, based on the state quantity of each local subtask, the Riemannian Motion Policy of the local subtask;

determine, based on the state quantity and Riemannian Motion Policy of each local subtask, the Riemannian Motion Policy of each subtask; and determine, based on kinetics parameters of the robot and the state quantity and Riemannian Motion Policy of each subtask, the Riemannian Motion Policy of each of the hierarchical tasks.

Those skilled in the art may clearly understand that, for the convenience and simplicity of description, for the specific operation process of the above-mentioned apparatus, module, and units, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

FIG. 5 is a schematic diagram of a robot according to an embodiment of the present disclosure. In this embodiment, a robot such as the above-mentioned robot is provided. For the convenience of explanation, only the parts related to this embodiment are shown.

As shown in FIG. 5, in this embodiment, the robot 5 includes a processor 50, a storage 51, and a computer program 52 stored in the storage 51 and executable on the processor 50. When executing (instructions in) the computer program 52, the processor 50 implements the steps in the above-mentioned embodiments of the robot force control method, for example, steps S101-S103 shown in FIG. 1. Alternatively, when the processor 50 executes the (instructions in) computer program 52, the functions of each module/unit in the above-mentioned device embodiments, for example, the functions of the modules 401-403 shown in FIG. 4 are implemented.

Exemplarily, the computer program 52 may be divided into one or more modules/units, and the one or more modules/units are stored in the storage 51 and executed by the processor 50 to realize the present disclosure. The one or more modules/units may be a series of computer program instruction sections capable of performing a specific function, and the instruction sections are for describing the execution process of the computer program 52 in the robot 5.

It can be understood by those skilled in the art that FIG. 5 is merely an example of the robot 5 and does not constitute a limitation on the robot 5, and may include more or fewer components than those shown in the figure, or a combination of some components or different components. For example, the robot 5 may further include an input/output device, a network access device, a bus, and the like.

The processor 50 may be a central processing unit (CPU), or be other general purpose processor, a digital signal processor (DSP), an application specific integrated circuit (ASIC), a field-programmable gate array (FPGA), or be other programmable logic device, a discrete gate, a transistor logic device, and a discrete hardware component. The general purpose processor may be a microprocessor, or the processor may also be any conventional processor.

The storage 51 may be an internal storage unit of the robot 5, for example, a hard disk or a memory of the robot 5. The storage 51 may also be an external storage device of the robot 5, for example, a plug-in hard disk, a smart media card (SMC), a secure digital (SD) card, flash card, and the like, which is equipped on the robot 5. Furthermore, the storage 51 may further include both an internal storage unit and an external storage device, of the robot 5. The storage 51 is configured to store the computer program 52 and other programs and data required by the robot 5. The storage 51 may also be used to temporarily store data that has been or will be output.

Those skilled in the art may clearly understand that, for the convenience and simplicity of description, the division of the above-mentioned functional units and modules is merely an example for illustration. In actual applications, the above-mentioned functions may be allocated to be performed by different functional units according to requirements, that is, the internal structure of the device may be divided into different functional units or modules to complete all or part of the above-mentioned functions. The functional units and modules in the embodiments may be integrated in one processing unit, or each unit may exist alone physically, or two or more units may be integrated in one unit. The above-mentioned integrated unit may be implemented in the form of hardware or in the form of software functional unit. In addition, the specific name of each functional unit and module is merely for the convenience of distinguishing each other and are not intended to limit the scope of protection of the present disclosure. For the specific operation process of the units and modules in the above-mentioned system, reference may be made to the corresponding processes in the above-mentioned method embodiments, and are not described herein.

In the above-mentioned embodiments, the description of each embodiment has its focuses, and the parts which are not described or mentioned in one embodiment may refer to the related descriptions in other embodiments.

Those ordinary skilled in the art may clearly understand that, the exemplificative units and steps described in the embodiments disclosed herein may be implemented through electronic hardware or a combination of computer software and electronic hardware. Whether these functions are implemented through hardware or software depends on the specific application and design constraints of the technical schemes. Those ordinary skilled in the art may implement the described functions in different manners for each particular application, while such implementation should not be considered as beyond the scope of the present disclosure.

In the embodiments provided by the present disclosure, it should be understood that the disclosed apparatus (device)/robot and method may be implemented in other manners. For example, the above-mentioned apparatus/robot embodiment is merely exemplary. For example, the division of modules or units is merely a logical functional division, and other division manner may be used in actual implementations, that is, multiple units or components may be combined or be integrated into another system, or some of the features may be ignored or not performed. In addition, the shown or discussed mutual coupling may be direct coupling or communication connection, and may also be indirect coupling or communication connection through some interfaces, devices or units, and may also be electrical, mechanical or other forms.

The units described as separate components may or may not be physically separated. The components represented as units may or may not be physical units, that is, may be located in one place or be distributed to multiple network units. Some or all of the units may be selected according to actual needs to achieve the objectives of this embodiment.

In addition, each functional unit in each of the embodiments of the present disclosure may be integrated into one processing unit, or each unit may exist alone physically, or two or more units may be integrated in one unit. The above-mentioned integrated unit may be implemented in the form of hardware or in the form of software functional unit.

When the integrated module/unit is implemented in the form of a software functional unit and is sold or used as an independent product, the integrated module/unit may be stored in a non-transitory computer readable storage medium. Based on this understanding, all or part of the processes in the method for implementing the above-mentioned embodiments of the present disclosure are implemented, and may also be implemented by instructing relevant hardware through a computer program. The computer program may be stored in a non-transitory computer readable storage medium, which may implement the steps of each of the above-mentioned method embodiments when executed by a processor. In which, the computer program includes computer program codes which may be the form of source codes, object codes, executable files, certain intermediate, and the like. The computer readable medium may include any entity or device capable of carrying the computer program codes, a recording medium, a USB flash drive, a portable hard disk, a magnetic disk, an optical disk, a computer memory, a read-only memory (ROM), a random access memory (RAM), electric carrier signals, telecommunication signals and software distribution media. It should be noted that the content contained in the computer readable medium may be appropriately increased or decreased according to the requirements of legislation and patent practice in the jurisdiction. For example, in some jurisdictions, according to the legislation and patent practice, a computer readable medium does not include electric carrier signals and telecommunication signals.

The above-mentioned embodiments are merely intended for describing but not for limiting the technical schemes of the present disclosure. Although the present disclosure is described in detail with reference to the above-mentioned embodiments, it should be understood by those skilled in the art that, the technical schemes in each of the above-mentioned embodiments may still be modified, or some of the technical features may be equivalently replaced, while these modifications or replacements do not make the essence of the corresponding technical schemes depart from the spirit and scope of the technical schemes of each of the embodiments of the present disclosure, and should be included within the scope of the present disclosure.

What is claimed is:

1. A force control method for a robot, comprising:

obtaining a joint acceleration control amount at a current control moment of the robot by performing a Riemannian Motion Policy-based motion generation on an overall target task of the robot;

determining, based on a preset control amount mapping relationship, a joint torque control amount at the current control moment according to the joint acceleration control amount at the current control moment, wherein the control amount mapping relationship is a mapping relationship between the joint acceleration control amount and the joint torque control amount; and executing the overall target task by performing a torque control on the robot according to the joint torque control amount at the current control moment.

2. The method of claim 1, determining, based on a preset control amount mapping relationship, a joint torque control amount at the current control moment according to the joint acceleration control amount at the current control moment comprises:

determining, based on the control amount mapping relationship, a joint torque mapping control amount corresponding to the joint acceleration control amount at the current control moment;

determining, based on an actual state quantity of a configuration space and the joint torque control amount at a previous control moment of the robot, an expected state quantity of the configuration space at the current control moment; and determining, based on the joint torque mapping control amount and the expected state quantity of the configuration space at the current control moment, the joint torque control amount at the current control moment.

3. The method of claim 2, determining, based on the joint torque mapping control amount and the expected state quantity of the configuration space at the current control moment, the joint torque control amount at the current control moment comprises:

calculating a state quantity difference between the expected state quantity and the actual state quantity of the configuration space at the current control moment; and obtaining the joint torque control amount at the current control moment by performing a proportional differential control on the joint torque mapping control amount according to the state quantity difference.

4. The method of claim 1, wherein the overall target task includes hierarchical tasks of different priorities; and obtaining the joint acceleration control amount at the current control moment of the robot by performing the Riemannian Motion Policy-based motion generation on the overall target task of the robot comprises:

solving the joint acceleration control amount of each of the hierarchical tasks in an order of the priorities from low to high by projecting the joint acceleration control amount of a next level task among the hierarchical tasks into the null space of a previous level task among the hierarchical tasks in the Riemannian Motion Policy-based motion.

5. The method of claim 4, solving the joint acceleration control amount of each of the hierarchical tasks in an order of the priorities from low to high by projecting the joint acceleration control amount of a next level task among the hierarchical tasks into the null space of a previous level task among the hierarchical tasks comprises:

determining, based on the actual state quantity of the configuration space at the current control moment, a Riemannian Motion Policy for each of the hierarchical tasks;

determining, according to the Riemannian Motion Policy of a first level task among the hierarchical tasks, a null space projection matrix of a second level task among the hierarchical tasks and the joint acceleration control amount of the first level task; and determining, based on the Riemannian Motion Policy of the i-th level task among the hierarchical tasks, the null space projection matrix of the i-th level task, and the joint acceleration control amount of the (i−1)-th level task, the null space projection matrix of the (i+1)-th level task and the joint acceleration control amount of the i-th level task until the joint acceleration control amount of the highest level task among the hierarchical tasks is obtained.

6. The method of claim 5, wherein each of the hierarchical tasks includes at least one subtask including at least one local subtask; and determining, based on the actual state quantity of the configuration space at the current control moment, the Riemannian Motion Policy for each of the hierarchical tasks comprises:

determining, based on the actual state quantity of the configuration space at the current control moment and a kinematic model of the robot, a state quantity of each of the hierarchical tasks, a state quantity of each subtask, and a state quantity of each local subtask;

determining, based on the state quantity of each local subtask, the Riemannian Motion Policy of the local subtask;

determining, based on the state quantity and Riemannian Motion Policy of each local subtask, the Riemannian Motion Policy of each subtask; and determining, based on kinetics parameters of the robot and the state quantity and Riemannian Motion Policy of each subtask, the Riemannian Motion Policy of each of the hierarchical tasks.

7. The method of claim 1, wherein after executing the overall target task by performing the torque control on the robot according to the joint torque control amount at the current control moment, the method further comprises performing a torque control on the robot at each subsequent control moment of the robot until a preset total number of time steps is reached.

8. A non-transitory computer-readable storage medium for storing one or more computer programs, wherein the one or more computer programs comprise:

instructions for obtaining a joint acceleration control amount at a current control moment of a robot by performing a Riemannian Motion Policy-based motion generation on an overall target task of the robot;

instructions for determining, based on a preset control amount mapping relationship, a joint torque control amount at the current control moment according to the joint acceleration control amount at the current control moment, wherein the control amount mapping relationship is a mapping relationship between the joint acceleration control amount and the joint torque control amount; and instructions for executing the overall target task by performing a torque control on the robot according to the joint torque control amount at the current control moment.

9. The storage medium of claim 8, wherein the instructions for determining, based on a preset control amount mapping relationship, a joint torque control amount at the current control moment according to the joint acceleration control amount at the current control moment comprise:

instructions for determining, based on the control amount mapping relationship, a joint torque mapping control amount corresponding to the joint acceleration control amount at the current control moment;

instructions for determining, based on an actual state quantity of a configuration space and the joint torque control amount at a previous control moment of the robot, an expected state quantity of the configuration space at the current control moment; and instructions for determining, based on the joint torque mapping control amount and the expected state quantity of the configuration space at the current control moment, the joint torque control amount at the current control moment.

10. The storage medium of claim 9, wherein the instructions for determining, based on the joint torque mapping control amount and the expected state quantity of the configuration space at the current control moment, the joint torque control amount at the current control moment comprise:

instructions for calculating a state quantity difference between the expected state quantity and the actual state quantity of the configuration space at the current control moment; and instructions for obtaining the joint torque control amount at the current control moment by performing a proportional differential control on the joint torque mapping control amount according to the state quantity difference.

11. The storage medium of claim 8, wherein the overall target task includes hierarchical tasks of different priorities; and the instructions for obtaining the joint acceleration control amount at the current control moment of the robot by performing the Riemannian Motion Policy-based motion generation on the overall target task of the robot comprise:

instructions for solving the joint acceleration control amount of each of the hierarchical tasks in an order of the priorities from low to high by projecting the joint acceleration control amount of a next level task among the hierarchical tasks into the null space of a previous level task among the hierarchical tasks in the Riemannian Motion Policy-based motion.

12. The storage medium of claim 11, wherein the instructions for solving the joint acceleration control amount of each of the hierarchical tasks in an order of the priorities from low to high by projecting the joint acceleration control amount of a next level task among the hierarchical tasks into the null space of a previous level task among the hierarchical tasks comprise:

instructions for determining, based on the actual state quantity of the configuration space at the current control moment, a Riemannian Motion Policy for each of the hierarchical tasks;

instructions for determining, according to the Riemannian Motion Policy of a first level task among the hierarchical tasks, a null space projection matrix of a second level task among the hierarchical tasks and the joint acceleration control amount of the first level task; and instructions for determining, based on the Riemannian Motion Policy of the i-th level task among the hierarchical tasks, the null space projection matrix of the i-th level task, and the joint acceleration control amount of the (i−1)-th level task, the null space projection matrix of the (i+1)-th level task and the joint acceleration control amount of the i-th level task until the joint acceleration control amount of the highest level task among the hierarchical tasks is obtained.

13. The storage medium of claim 12, wherein each of the hierarchical tasks includes at least one subtask including at least one local subtask; and the instructions for determining, based on the actual state quantity of the configuration space at the current control moment, the Riemannian Motion Policy for each of the hierarchical tasks comprise:

instructions for determining, based on the actual state quantity of the configuration space at the current control moment and a kinematic model of the robot, a state quantity of each of the hierarchical tasks, a state quantity of each subtask, and a state quantity of each local subtask;

instructions for determining, based on the state quantity of each local subtask, the Riemannian Motion Policy of the local subtask;

instructions for determining, based on the state quantity and Riemannian Motion Policy of each local subtask, the Riemannian Motion Policy of each subtask; and instructions for determining, based on kinetics parameters of the robot and the state quantity and Riemannian Motion Policy of each subtask, the Riemannian Motion Policy of each of the hierarchical tasks.

14. A robot, comprising:

a processor;

a memory coupled to the processor; and one or more computer programs stored in the memory and executable on the processor;

wherein, the one or more computer programs comprise:

instructions for obtaining a joint acceleration control amount at a current control moment of the robot by performing a Riemannian Motion Policy-based motion generation on an overall target task of the robot;

instructions for determining, based on a preset control amount mapping relationship, a joint torque control amount at the current control moment according to the joint acceleration control amount at the current control moment, wherein the control amount mapping relationship is a mapping relationship between the joint acceleration control amount and the joint torque control amount; and instructions for executing the overall target task by performing a torque control on the robot according to the joint torque control amount at the current control moment.

15. The robot of claim 14, wherein the instructions for determining, based on a preset control amount mapping relationship, a joint torque control amount at the current control moment according to the joint acceleration control amount at the current control moment comprise:

instructions for determining, based on the control amount mapping relationship, a joint torque mapping control amount corresponding to the joint acceleration control amount at the current control moment;

instructions for determining, based on an actual state quantity of a configuration space and the joint torque control amount at a previous control moment of the robot, an expected state quantity of the configuration space at the current control moment; and instructions for determining, based on the joint torque mapping control amount and the expected state quantity of the configuration space at the current control moment, the joint torque control amount at the current control moment.

16. The robot of claim 15, wherein the instructions for determining, based on the joint torque mapping control amount and the expected state quantity of the configuration space at the current control moment, the joint torque control amount at the current control moment comprise:

instructions for calculating a state quantity difference between the expected state quantity and the actual state quantity of the configuration space at the current control moment; and instructions for obtaining the joint torque control amount at the current control moment by performing a proportional differential control on the joint torque mapping control amount according to the state quantity difference.

17. The robot of claim 14, wherein the overall target task includes hierarchical tasks of different priorities; and the instructions for obtaining the joint acceleration control amount at the current control moment of the robot by performing the Riemannian Motion Policy-based motion generation on the overall target task of the robot comprise:

instructions for solving the joint acceleration control amount of each of the hierarchical tasks in an order of the priorities from low to high by projecting the joint acceleration control amount of a next level task among the hierarchical tasks into the null space of a previous level task among the hierarchical tasks in the Riemannian Motion Policy-based motion.

18. The robot of claim 17, wherein the instructions for solving the joint acceleration control amount of each of the hierarchical tasks in an order of the priorities from low to high by projecting the joint acceleration control amount of a next level task among the hierarchical tasks into the null space of a previous level task among the hierarchical tasks comprise:

instructions for determining, based on the actual state quantity of the configuration space at the current control moment, a Riemannian Motion Policy for each of the hierarchical tasks;

instructions for determining, according to the Riemannian Motion Policy of a first level task among the hierarchical tasks, a null space projection matrix of a second level task among the hierarchical tasks and the joint acceleration control amount of the first level task; and instructions for determining, based on the Riemannian Motion Policy of the i-th level task among the hierarchical tasks, the null space projection matrix of the i-th level task, and the joint acceleration control amount of the (i−1)-th level task, the null space projection matrix of the (i+1)-th level task and the joint acceleration control amount of the i-th level task until the joint acceleration control amount of the highest level task among the hierarchical tasks is obtained.

19. The robot of claim 18, wherein each of the hierarchical tasks includes at least one subtask including at least one local subtask; and the instructions for determining, based on the actual state quantity of the configuration space at the current control moment, the Riemannian Motion Policy for each of the hierarchical tasks comprise:

instructions for determining, based on the actual state quantity of the configuration space at the current control moment and a kinematic model of the robot, a state quantity of each of the hierarchical tasks, a state quantity of each subtask, and a state quantity of each local subtask;

instructions for determining, based on the state quantity of each local subtask, the Riemannian Motion Policy of the local subtask;

instructions for determining, based on the state quantity and Riemannian Motion Policy of each local subtask, the Riemannian Motion Policy of each subtask; and instructions for determining, based on kinetics parameters of the robot and the state quantity and Riemannian Motion Policy of each subtask, the Riemannian Motion Policy of each of the hierarchical tasks.

20. The robot of claim 14, wherein the one or more computer programs further comprises instructions for performing a torque control on the robot at each subsequent control moment of the robot until a preset total number of time steps is reached.

* * * * *